(12) United States Patent
Duguay

(10) Patent No.: US 9,863,538 B2
(45) Date of Patent: Jan. 9, 2018

(54) GAS TURBINE ENGINE BRUSH SEAL WITH SUPPORTED TIP

(71) Applicant: United Technologies Corporation, Hartford, CT (US)

(72) Inventor: Brian Duguay, Berwick, ME (US)

(73) Assignee: United Technologies Corporation, Farmington, CT (US)

( * ) Notice: Subject to any disclaimer, the term of this patent is extended or adjusted under 35 U.S.C. 154(b) by 255 days.

(21) Appl. No.: 14/697,104

(22) Filed: Apr. 27, 2015

(65) Prior Publication Data
US 2016/0312637 A1 Oct. 27, 2016

(51) Int. Cl.
F16J 15/16 (2006.01)
F16J 15/32 (2016.01)
F16J 15/3288 (2016.01)
F01D 25/24 (2006.01)
F01D 11/00 (2006.01)

(52) U.S. Cl.
CPC ........ F16J 15/3288 (2013.01); F01D 25/246 (2013.01); F01D 11/005 (2013.01); F05D 2240/11 (2013.01); F05D 2240/56 (2013.01); Y02T 50/672 (2013.01)

(58) Field of Classification Search
CPC F16J 15/3284; F16J 15/3288; F05D 2240/56; F01D 11/005
See application file for complete search history.

(56) References Cited

U.S. PATENT DOCUMENTS

| 5,114,159 | A | * | 5/1992 | Baird | F01D 5/10 277/355 |
|---|---|---|---|---|---|
| 5,480,162 | A | | 1/1996 | Beeman, Jr. | |
| 6,170,831 | B1 | | 1/2001 | Bouchard | |
| 6,910,858 | B2 | | 6/2005 | Addis | |
| 7,093,835 | B2 | * | 8/2006 | Addis | F01D 11/005 277/355 |
| 7,334,311 | B2 | | 2/2008 | Addis | |
| 7,454,822 | B2 | | 11/2008 | Szymbor et al. | |
| 7,458,584 | B2 | | 12/2008 | Addis | |
| 7,931,276 | B2 | | 4/2011 | Szymbor et al. | |
| 7,967,558 | B2 | | 6/2011 | Scricca | |
| 8,181,965 | B2 | | 5/2012 | Addis | |
| 8,366,115 | B2 | | 2/2013 | Addis | |
| 8,528,178 | B2 | | 9/2013 | Sparks | |
| 8,727,353 | B2 | | 5/2014 | Addis | |
| 8,727,354 | B2 | | 5/2014 | Addis | |
| 2004/0041348 | A1 | * | 3/2004 | Addis | F01D 11/005 277/355 |
| 2004/0217549 | A1 | * | 11/2004 | Justak | F01D 11/00 277/355 |
| 2008/0128996 | A1 | * | 6/2008 | Grace | F16J 15/3288 277/355 |

(Continued)

Primary Examiner — Gilbert Y Lee
(74) Attorney, Agent, or Firm — O'Shea Getz P.C.

(57) ABSTRACT

As assembly is provided for a gas turbine engine. This assembly includes a component and a brush seal. The component includes a first surface and a second surface. The brush seal includes an annular bundle of bristles which extends longitudinally along an axis to a bundle tip. The bundle of bristles axially contacts the first surface at the bundle tip. The bundle of bristles proximate the bundle tip axially overlaps the second surface, and the bundle of bristles is operable to radially contact the second surface.

20 Claims, 7 Drawing Sheets

(56) References Cited

U.S. PATENT DOCUMENTS

| | | | |
|---|---|---|---|
| 2010/0327534 A1* | 12/2010 | Powar | F01D 11/02 277/355 |
| 2010/0327535 A1* | 12/2010 | Grace | F16J 15/3288 277/355 |
| 2013/0170979 A1* | 7/2013 | Sha | F01D 11/001 415/229 |
| 2016/0040600 A1* | 2/2016 | Lutjen | F01D 11/02 60/805 |
| 2016/0061330 A1* | 3/2016 | Davis | B23K 31/02 277/355 |

* cited by examiner

GAS TURBINE ENGINE BRUSH SEAL WITH SUPPORTED TIP

BACKGROUND OF THE INVENTION

1. Technical Field

This disclosure relates generally to a seal for a gas turbine engine and, more particularly, to a brush seal arrangement.

2. Background Information

Various seals are known in the art for sealing gaps in a gas turbine engine. One such seal is a brush seal. While a typical prior art brush seal has various advantageous, there is still room for improvement to further reduce leakage across the brush seal.

SUMMARY OF THE DISCLOSURE

According to an aspect of the invention, an assembly is provided for a gas turbine engine. This turbine engine assembly includes a component and a brush seal. The component includes a first surface and a second surface. The brush seal includes an annular bundle of bristles which extends longitudinally along an axis to a bundle tip. The bundle of bristles axially contacts the first surface at the bundle tip. The bundle of bristles proximate the bundle tip axially overlaps the second surface, and the bundle of bristles is operable to radially contact the second surface.

According to another aspect of the invention, another assembly is provided for a gas turbine engine. This turbine engine assembly includes a brush seal and a component. The brush seal includes a bundle of bristles. The bundle of bristles extends longitudinally along an axis to a bundle tip and extends circumferentially around the axis. The component includes a first portion and a second portion projecting axially out from the first portion. The first portion includes a first surface. The second portion includes a second surface. The bundle of bristles axially contacts the first surface at the bundle tip. The bundle of bristles radially contacts the second surface.

According to still another aspect of the invention, still another assembly is provided for a gas turbine engine. This turbine engine assembly includes a component and a brush seal. The component includes a first surface and an adjacent second surface. The brush seal includes a plurality of bristles. The bristles longitudinally extend along an axis to respective bristle tips. The bristles are arranged circumferentially around the axis in an annular bundle of bristles. The bundle of bristles axially contacts the first surface at the bristle tips. The bundle of bristles is operable to lay radially against the second surface.

The first surface may be contiguous with the second surface at a corner.

The first surface may be perpendicular to the second surface.

An included angle between the first surface and the second surface may be acute or obtuse.

The bristles may be arranged circumferentially around the axis. Each of the bristles may extend longitudinally along the axis to a respective bristle tip at the bundle tip.

One of the bristles may be parallel with the axis. In addition or alternatively, one of the bristles may be angularly offset from the axis.

The brush seal may include a first ring and a second ring. The bundle of bristles may be radially between and attached to the first and the second rings.

The turbine engine assembly may include a second component with which the brush seal is mounted. The brush seal may be configured to substantially seal an axial gap between the component and the second component.

The turbine engine assembly may include a second component including a third surface. The bundle of bristles may extend longitudinally along the axis to a second bundle tip opposite the bundle tip. The bundle of bristles may axially contact the third surface at the second bundle tip.

The second component may include a fourth surface. The bundle of bristles proximate the second bundle tip may axially overlap the fourth surface. The bundle of bristles may be operable to radially contact the fourth surface.

The bundle of bristles may be configured to radially contact the second surface.

The bundle of bristles may be configured to be radially disengaged from the second surface during a first mode of operation. The bundle of bristles may be configured to radially contact the second surface during a second mode of operation.

The bristles may be arranged circumferentially around the axis. Each of the bristles may extend longitudinally along the axis to a respective bristle tip at the bundle tip.

The turbine engine assembly may include a stator vane structure which comprises the component. The turbine engine assembly may also include a blade outer air seal. The brush seal may at least partially seal an axial gap between the stator vane structure and the blade outer air seal.

The turbine engine assembly may include a second component including a third surface. The bristles may longitudinally extend along the axis to respective second bristle tips which are opposite the bristle tips. The bundle of bristles may axially contact the third surface at the second bristle tips.

The foregoing features and the operation of the invention will become more apparent in light of the following description and the accompanying drawings.

DETAILED DESCRIPTION OF THE INVENTION

Figure 1:
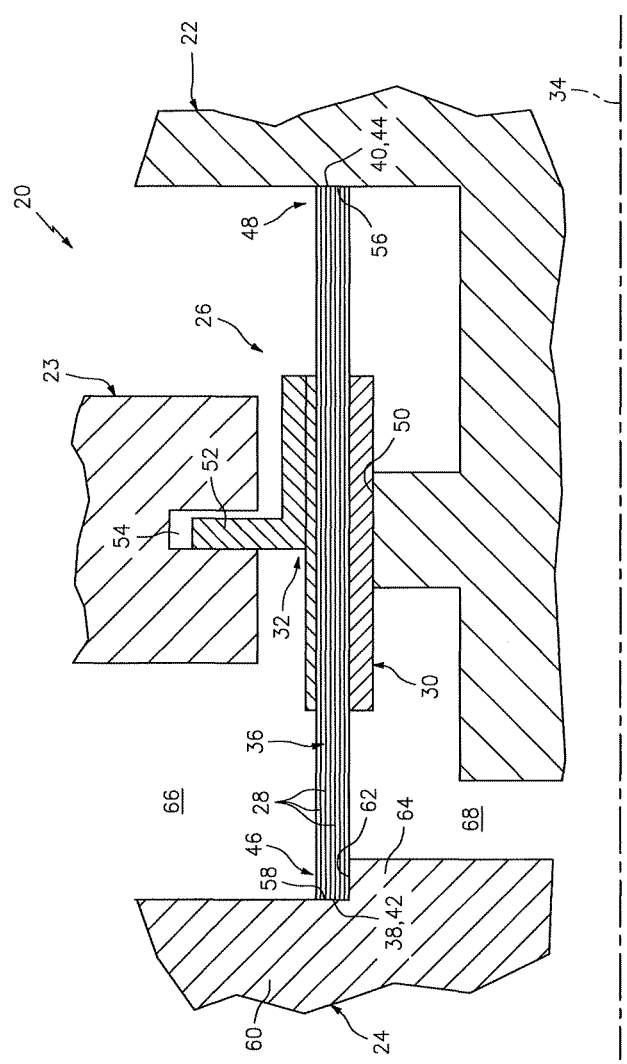
FIG. 1 is side sectional illustration of a portion of an assembly for a gas turbine engine which includes a brush seal.

FIG. 1 illustrates an assembly 20 for a gas turbine engine. This turbine engine assembly 20 includes one or more engine components 22-24 and a brush seal 26 configured for at least partially sealing one or more gaps between the components 22 and 23, 23 and 24 and/or 22 and 24.

Figure 2:
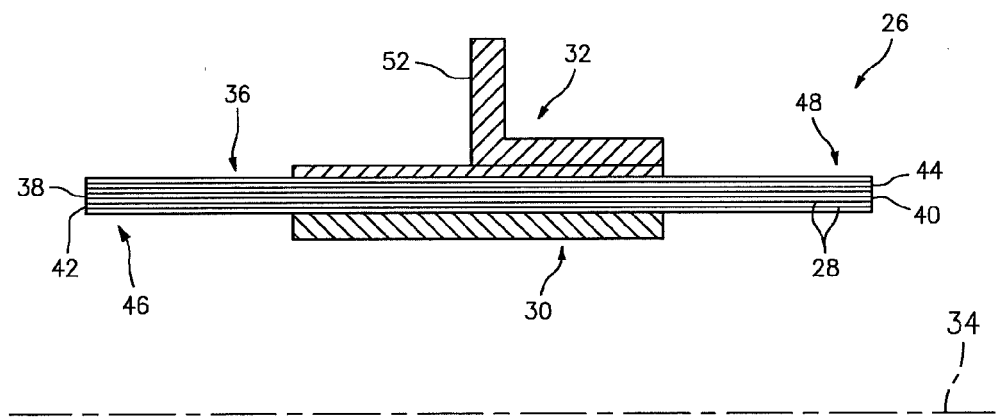
FIG. 2 is a side sectional illustration of a portion of the brush seal.
Figure 3:
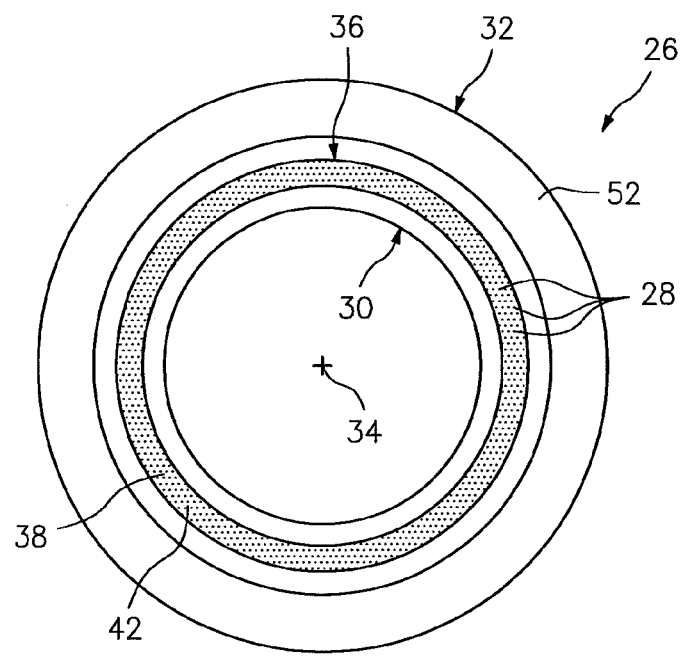
FIG. 3 is an end view illustration of the brush seal.

Referring to FIGS. 2 and 3, the brush seal 26 may be configured as a double ended brush seal. This brush seal 26 includes a plurality of bristles 28. The brush seal 26 also includes one or more mounting rings 30 and 32.

The bristles 28 are arranged circumferentially around an axis 34 in a bundle 36 of bristles. This bundle 36 of bristles may be an annular bundle of bristles and extends circumferentially around the axis 34. The bundle 36 of bristles, for example, may include one or more annular arrays (e.g., rows) of the bristles 28. For most applications, the bundle 36 of bristles includes a plurality of arrays of the bristles 28. These arrays of the bristles 28 are stacked radially on top of one another. The stacked arrays of the bristles 28 may also be circumferentially staggered so as to provide a more compact and dense brush seal body as well as a more torturous leakage path radially through the bundle 36 of bristles.

The bundle 36 of bristles extends longitudinally along the axis 34 between opposing bundle tips 38 and 40. In particular, each of the bristles 28 extends longitudinally (e.g., along its length) between opposing bristle tips 42 and 44. The bristle tip 42 is located at the bundle tip 38. The bristle tip 42, for example, may be disposed on, adjacent or proximate the bundle tip 38 depending upon the specific alignment of that bristle 28 with the other bristles 28 in the bundle 36. The bristle tip 44 is located at the bundle tip 40. The bristle tip 44, for example, may be disposed on, adjacent or proximate the bundle tip 40 depending upon the specific alignment of that bristle 28 with the other bristles 28 in the bundle 36.

Figure 4:
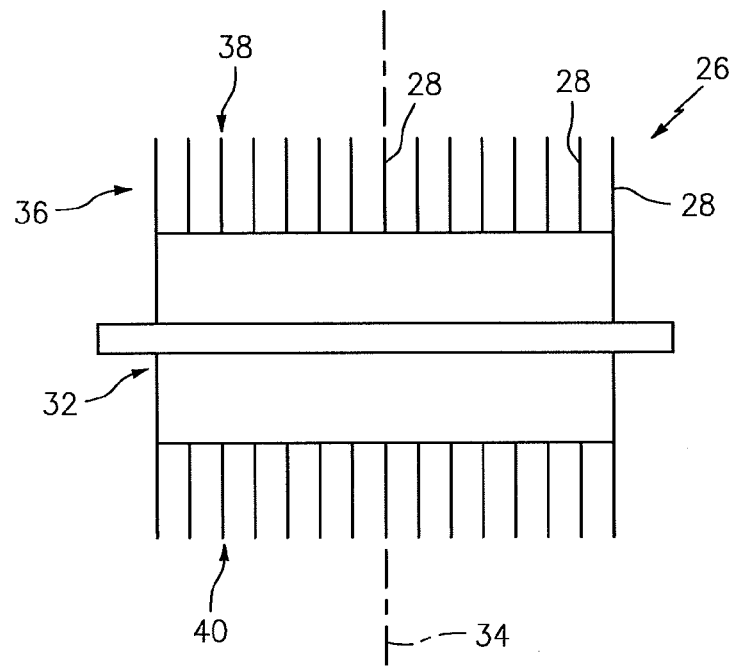
FIG. 4 is a side view illustration of another brush seal.
Figure 5:
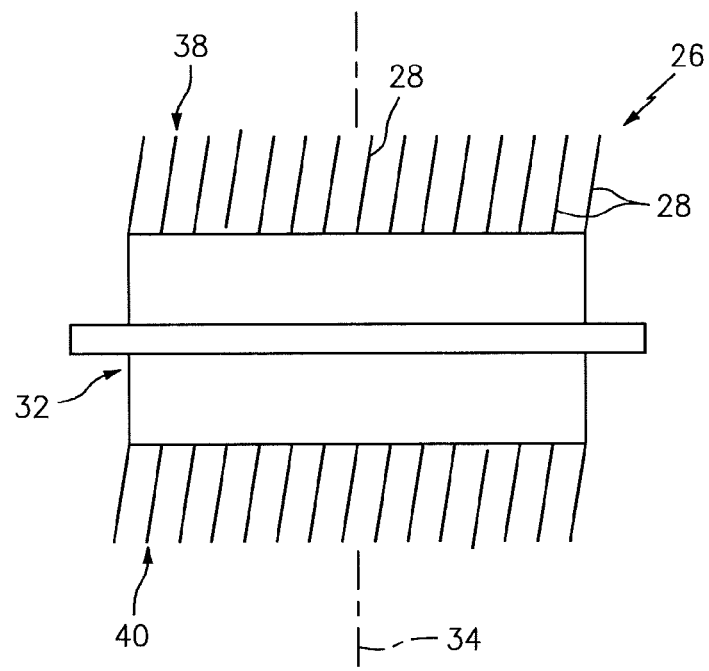
FIG. 5 is a side view illustration of another brush seal.

Referring to FIG. 4, one or more the bristles 28 may be substantially parallel with one another and the axis 34. Alternatively, referring to FIG. 5, one or more of the bristles 28 may be angularly offset from the axis 34, for example, between about forty degrees (40°) and about fifty degrees (50°). In addition, one or more of the bristles 28, for example in different arrays, may be angularly offset from one another.

Each of the bristles 28 may be configured as a length of metal or metal alloy wire with a circular cross-sectional geometry. The brush seal 26 of the present disclosure, however, is not limited to the foregoing exemplary configurations or materials. One or more of the bristles 28, for example, may have non-circular cross-sectional geometry and/or may be formed from a material other than metal or metal alloy such as a composite. Various other bristle bundle arrangements are also known in the art, and the present disclosure is not limited to any particular type of arrangement of the bristles 28 within the bundle 36.

Referring to FIGS. 2 and 3, the bundle 36 of bristles is sandwiched radially between the inner and the outer mounting rings 30 and 32. The bundle 36 of bristles may be attached (e.g., bonded and/or mechanically fastened) to the inner mounting ring 30 and/or the outer mounting ring 32. The bundle 36 of bristles, for example, may be welded, brazed, adhered and/or otherwise bonded to the inner and the outer mounting rings 30 and 32. The bundle 36 of bristles projects, in an axial first direction, from the mounting rings 30 and 32 to the bundle tip 38. The bundle 36 of bristles also projects, in an axial second direction which is opposite the first direction, from the mounting rings 30 and 32 to the bundle tip 40. In this manner, opposing tips portions 46 and 48 of the bundle 36 of bristles near the bundle tips 38 and 40 are axially cantilevered from the mounting rings 30 and 32.

Referring to FIG. 1, the brush seal 26 is mounted between the engine component 22 and the engine component 23. The inner mounting ring 30 circumscribes and may radially engage a portion of the engine component 22. The inner mounting ring 30, for example, may radially contact and be axially slidingly seated against an axially extending support and/or seal surface 50 of the engine component 22. The outer mounting ring 32 is disposed within and may engage a portion of the engine component 23. The outer mounting ring 32, for example, may include an annular flange 52 which projected radially into a slot 54 in the engine component 23. This flange 52 may serve to axially restrain (e.g., limit) movement of the brush seal 26 relative to the engine component 23. With this type of configuration, the brush seal 26 may circumferentially, axially and/or radially float (e.g., slide and/or otherwise move) between the engine components 22-24. However, in other embodiments, the brush seal 26 may be circumferentially, axially and/or radially fixedly mounted to the engine component 22 and/or the engine component 23.

The brush seal 26 is also arranged axially between the engine component 22 and the engine component 24. At least some of the bristles 28 and, thus, the bundle 36 of bristles may engage the engine component 22. The bundle 36 of bristles at the bundle tip 40, for example, may axially contact a radially extending seal surface 56 of the engine component 22, which surface 56 may be generally perpendicular to the surface 50. The brush seal 26 may thereby sealingly engage the engine component 22.

At least some of the bristles 28 and, thus, the bundle 36 of bristles may also or alternatively engage the third component 24. The bundle 36 of bristles at the bundle tip 38, for example, may axially contact a radially extending seal surface 58 of a first portion 60 of the third component 24. The brush seal 26 may thereby sealingly engage the third component 24.

Figure 6:
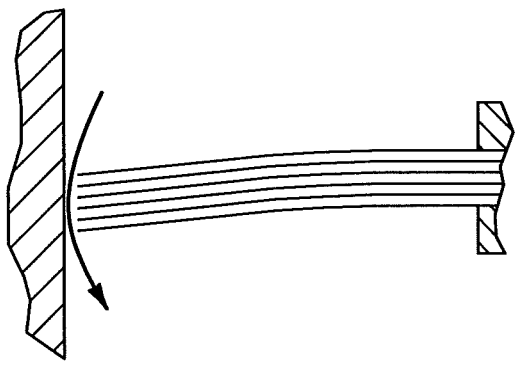
FIG. 6 is a side sectional illustration of a portion of another brush seal disengaged from a component during engine operation.

The tip portion 46 of the bundle 36 of bristles at (e.g., proximate) the bundle tip 38 may also radially contact an axially extending support and/or seal surface 62 of a second portion 64 of the third component 24. The second portion 64 may project axially out from the first portion 60. The surface 62 therefore may be contiguous with and/or adjacent to the surface 58 at a corner therebetween. The second portion 64 of the third component 24 may thereby radially support the tip portion 46 of the bundle 36 of bristles. Such radial support may be particularly useful where gas pressure in a region 66 (e.g., cavity, plenum, gas path, etc.) above the brush seal 26 is greater than gas pressure in a region 68 (e.g., cavity, plenum, gas path, etc.) below the brush seal 26. For example, radially supporting the tip portion 46 of the bundle 36 of bristles as shown in FIG. 1 may prevent the bundle tip 38 from being pushed radially inwards to an extent which would allow gas to leak around the bundle tip as shown in FIG. 6 where radial support is omitted.

Figure 7:
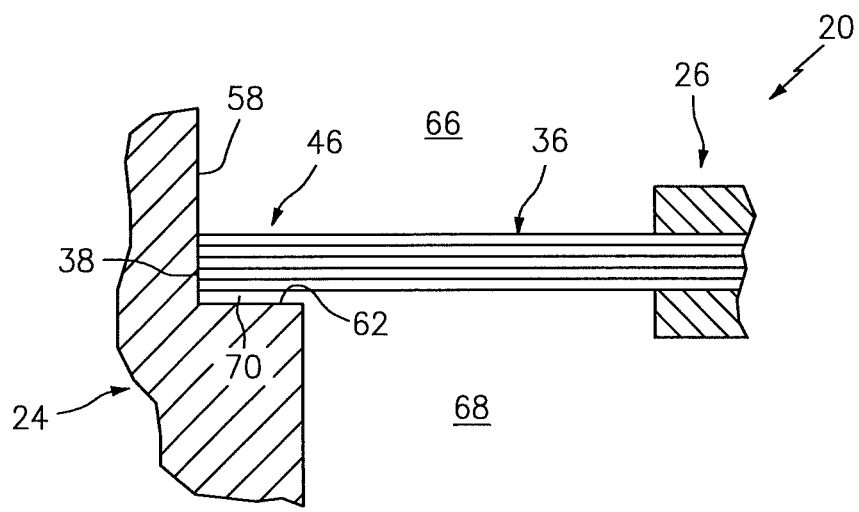
FIG. 7 is a side sectional illustration of a portion of another brush seal axially engaged with a component during a first mode of engine operation.

Referring to FIG. 7, in some embodiments, the tip portion 46 of the bundle 36 of bristles may axially overlap the second surface 62, but be radially disengaged from the second surface 62 during at least one mode of engine operation. The tip portion 46, more particularly, may be disposed next to and radially outboard of the second surface 62, but separated from the second surface 62 by a radial gap 70. During such a mode of operation, a stiffness of the bundle 36 of bristles is large enough so as to accommodate a pressure differential between the regions 66 and 68. Examples of such a mode of engine operation may include, but are not limited to, engine stop, engine startup, engine idle and/or any other mode where the pressure differential is below a threshold value.

Figure 8:
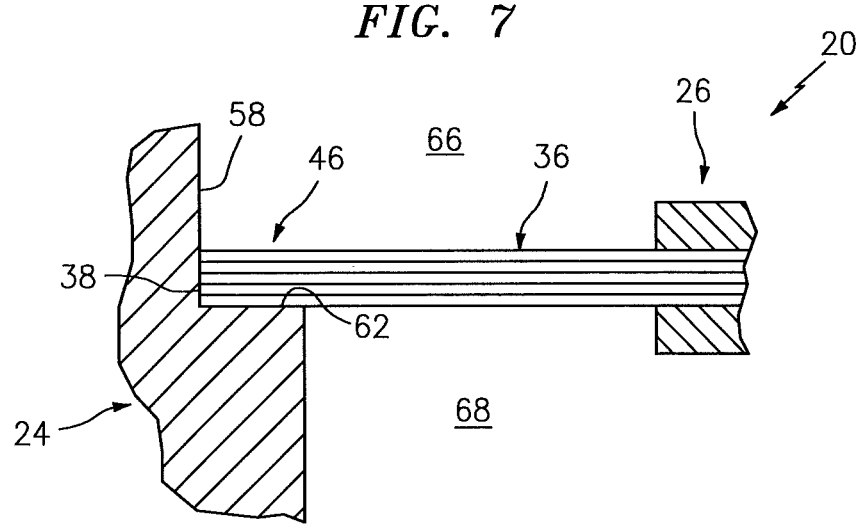
FIG. 8 is a side sectional illustration of the brush seal portion of FIG. 7 axially and radially engaged with the component during a second mode of engine operation.

In contrast as shown in FIG. 8, where the pressure differential between the regions 66 and 68 is equal to or above the threshold value, the bundle 36 of bristles may be bowed or otherwise bent slightly radially inward such that the tip portion 46 radially contacts and is supported by the second surface 62. Such a pressure differential may occur during a mode of engine operation such as, for example, engine cruise, aircraft takeoff, engine max thrust, etc.

Figure 9:
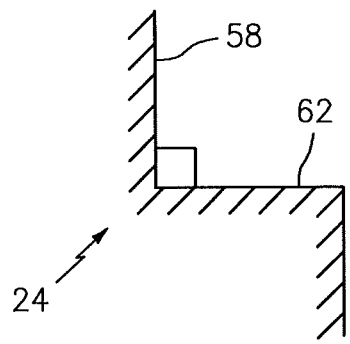
FIGS. 9-11 are illustrations of different component configurations for the assembly of FIG. 1.
Figure 10:
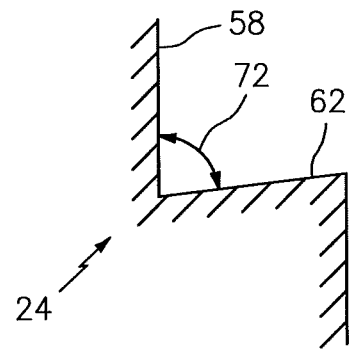
Figure 11:
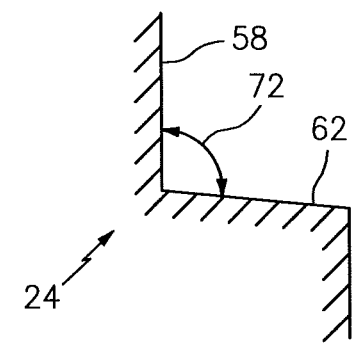

In some embodiments, the first surface 58 may be perpendicular to the second surface 62 as illustrated in FIG. 9. In other embodiments as illustrated in FIGS. 10 and 11, however, the first and the second surfaces 58 and 60 may be angularly offset, for example, so as to accommodate thermal deflection of the engine components 22-24. For example, referring to FIG. 10, an included angle 72 between the first surface 58 and the second surface 62 may be acute. The acute included angle, for example, may be between seventy-five degrees (75°) and ninety degrees (90°). In another example, referring to FIG. 11, the included angle 72 between the first surface 58 and the second surface 62 may be obtuse. The obtuse included angle 72, for example, may be between ninety degrees (90°) and one hundred and five degrees (105°). The present disclosure, however, is not limited to the foregoing exemplary values.

Figure 12:
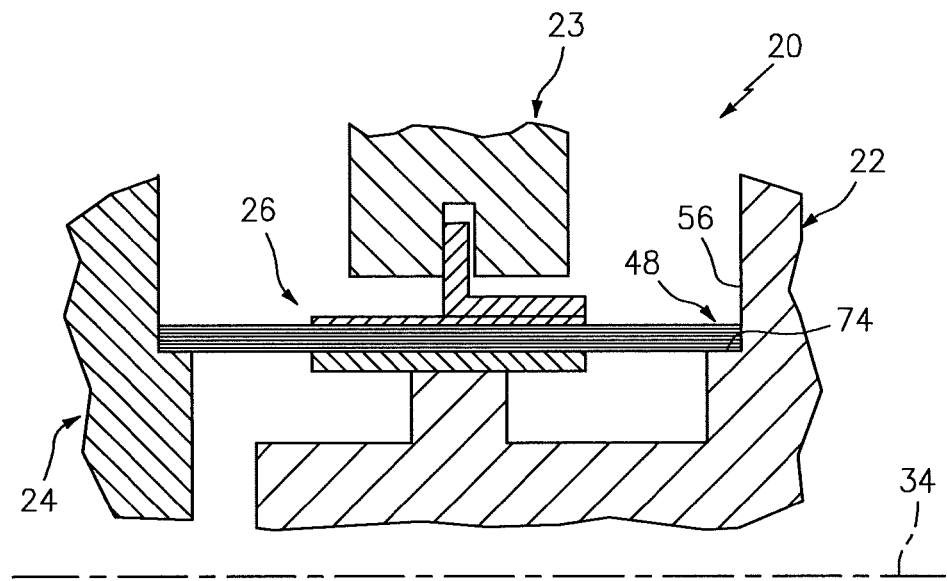
FIG. 12 is side sectional illustration of a portion of another assembly for a gas turbine engine which includes a brush seal.

Referring to FIG. 12, in some embodiments, the tip portion 48 of the bundle 36 of bristles may also or alternatively be radially supported in a similar manner as described above with respect to the tip portion 46. For example, the tip portion 48 may be operable to radially contact an axially extending support and/or seal surface 74 of the engine component 22, which surface 74 may be contiguous with and/or adjacent to the surface 56.

Figure 13:
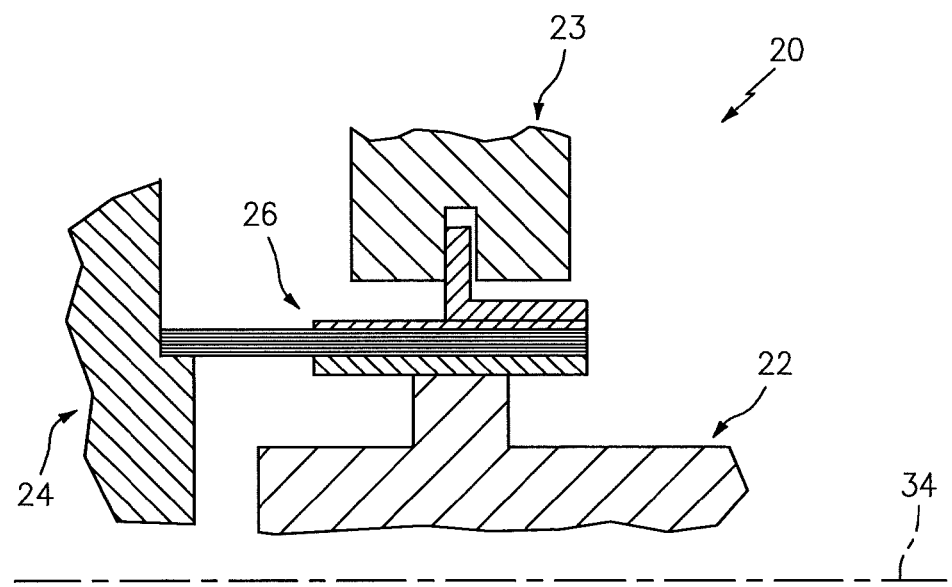
FIG. 13 is a side sectional illustration of a portion of another assembly for a gas turbine engine which includes a brush seal.

While the brush seal 26 is described above with a double ended configuration, the brush seal 26 of the present disclosure is not limited thereto. In other embodiments, for example as shown in FIG. 13, the brush seal 26 may be configured as a single ended brush seal. With such a configuration, the brush seal 26 may be configured without the tip portion 48 (see FIGS. 1 and 12).

Figure 14:
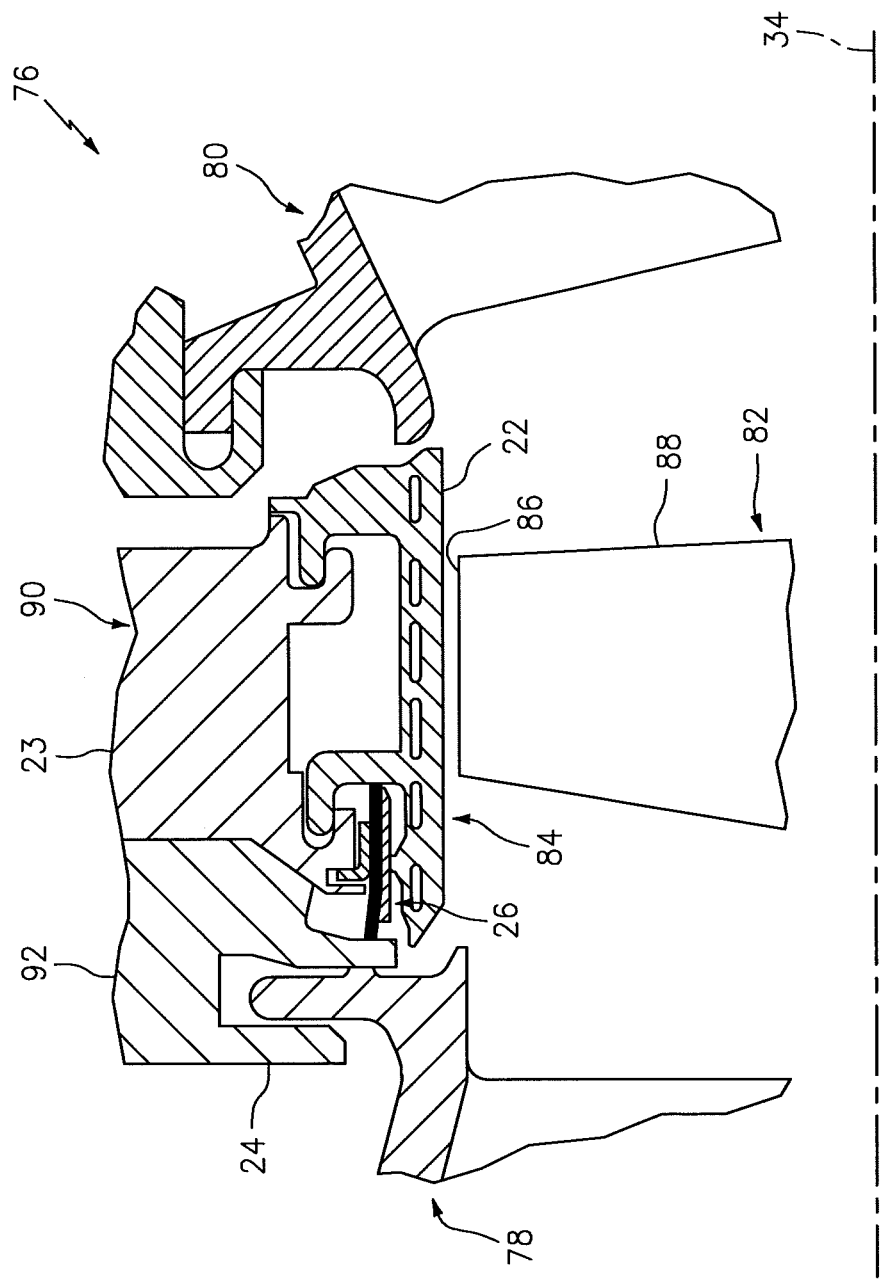
FIG. 14 is a side sectional illustration of a portion of a turbine assembly which includes the assembly of FIG. 1.

FIG. 14 illustrates a turbine assembly 76 for a gas turbine engine. This turbine assembly 76 includes one or more stator vane structures 78 and 80, a rotor 82 and a blade outer air seal 84 (sometimes also referred to as a "BOAS" or a "shroud"). The blade outer air seal 84 may be ablatable and is configured to reduce or eliminate gas leakage across tips 86 of rotor blades 88 included with the rotor 82.

The turbine assembly 76 also includes the assembly 20 described above. The engine component 22, in particular, is configured as or otherwise includes the blade outer air seal 84. The engine component 23 is configured as or otherwise includes a BOAS support structure 90 associated with the blade outer air seal 84. The third component 24 is configured as or otherwise includes the vane structure 78 and, more, particularly, a vane assembly support structure 92 included in the vane structure 78. The brush seal 26 is configured with the vane structure 78, the blade outer air seal 84 and the BOAS support structure 90 to reduce gas leakage therebetween. With this arrangement, the brush seal 26 may substantially seal one or more axial gaps respectively between the components 90 and 92, 84 and 90, and/or 84 and 92.

However, the turbine engine assembly 20 of the present disclosure is not limited to the foregoing exemplary application.

The turbine engine assembly 20 may be included in various gas turbine engines, including turbine engines configured for aircraft propulsion systems as well as turbine engines configured for industrial applications. The turbine engine assembly 20, for example, may be included in a geared turbine engine where a gear train connects one or more shafts to one or more rotors in a fan section, a compressor section and/or any other engine section. Alternatively, the turbine engine assembly 20 may be included in a turbine engine configured without a gear train. The turbine engine assembly 20 may be included in a geared or non-geared turbine engine configured with a single spool, with two spools, or with more than two spools. The turbine engine may be configured as a turbofan engine, a turbojet engine, a propfan engine, a pusher fan engine or any other type of turbine engine. The present invention therefore is not limited to any particular types or configurations of gas turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for a gas turbine engine, comprising:
   a component including a first surface and a second surface; and
   a brush seal including an annular bundle of bristles which extends longitudinally along an axis to a bundle tip;
   wherein the bundle of bristles axially contacts the first surface at the bundle tip; and
   wherein the bundle of bristles proximate the bundle tip axially overlaps the second surface, and the bundle of bristles is operable to radially contact the second surface.

2. The assembly of claim 1, wherein the first surface is contiguous with the second surface at a corner.

3. The assembly of claim 1, wherein the first surface is perpendicular to the second surface.

4. The assembly of claim 1, wherein an included angle between the first surface and the second surface is acute.

5. The assembly of claim 1, wherein an included angle between the first surface and the second surface is obtuse.

6. The assembly of claim 1, wherein the bristles are arranged circumferentially around the axis, and each of the bristles extends longitudinally along the axis to a respective bristle tip at the bundle tip.

7. The assembly of claim 6, wherein a first of the bristles is parallel with the axis.

8. The assembly of claim 6, wherein a first of the bristles is angularly offset from the axis.

9. The assembly of claim 1, wherein the brush seal further includes a first ring and a second ring, and the bundle of bristles is radially between and attached to the first and the second rings.

10. The assembly of claim 1, further comprising a second component with which the brush seal is mounted, wherein the brush seal is configured to substantially seal an axial gap between the component and the second component.

11. The assembly of claim 1, further comprising:
a second component including a third surface;
wherein the bundle of bristles extends longitudinally along the axis to a second bundle tip opposite the bundle tip, and the bundle of bristles axially contacts the third surface at the second bundle tip.

12. The seal assembly of claim 11, wherein the second component further includes a fourth surface, the bundle of bristles proximate the second bundle tip axially overlaps the fourth surface, and the bundle of bristles is operable to radially contact the fourth surface.

13. The seal assembly of claim 1, wherein the bundle of bristles is configured to radially contact the second surface.

14. The seal assembly of claim 1, wherein
the bundle of bristles is configured to be radially disengaged from the second surface during a first mode of operation; and
the bundle of bristles is configured to radially contact the second surface during a second mode of operation.

15. An assembly for a gas turbine engine, comprising:
a brush seal including a bundle of bristles, the bundle of bristles extending longitudinally along an axis to a bundle tip and extending circumferentially around the axis; and
a component including a first portion and a second portion projecting axially out from the first portion, the first portion including a first surface, and the second portion including a second surface;
wherein the bundle of bristles axially contacts the first surface at the bundle tip, and the bundle of bristles radially contacts the second surface.

16. The assembly of claim 15, wherein the bristles are arranged circumferentially around the axis, and each of the bristles extends longitudinally along the axis to a respective bristle tip at the bundle tip.

17. The assembly of claim 15, further comprising:
a stator vane structure which comprises the component; and
a blade outer air seal;
wherein the brush seal at least partially seals an axial gap between the stator vane structure and the blade outer air seal.

18. An assembly for a gas turbine engine, comprising:
a component including a first surface and an adjacent second surface; and
a brush seal including a plurality of bristles, the bristles longitudinally extending along an axis to respective bristle tips, and the bristles arranged circumferentially around the axis in an annular bundle of bristles;
wherein the bundle of bristles axially contacts the first surface at the bristle tips; and
wherein the bundle of bristles is operable to lay radially against the second surface.

19. The assembly of claim 18, further comprising:
a second component including a third surface;
wherein the bristles longitudinally extend along the axis to respective second bristle tips which are opposite the bristle tips, and the bundle of bristles axially contacts the third surface at the second bristle tips.

20. The assembly of claim 18, further comprising:
a stator vane structure which comprises the component; and
a blade outer air seal;
wherein the brush seal at least partially seals an axial gap between the stator vane structure and the blade outer air seal.

* * * * *